United States Patent [19]

Chmura

[11] 4,233,565

[45] Nov. 11, 1980

[54] METHOD AND APPARATUS FOR A PSK SIGNAL DETECTOR

[75] Inventor: Stanley J. Chmura, Elmhurst, Ill.

[73] Assignee: Motorola, Inc., Schaumburg, Ill.

[21] Appl. No.: 53,494

[22] Filed: Jun. 29, 1979

Related U.S. Application Data

[63] Continuation of Ser. No. 920,439, Jun. 29, 1978, abandoned.

[51] Int. Cl.³ ............................................ H04L 27/22
[52] U.S. Cl. ...................................... 329/50; 329/107; 329/111; 375/83; 375/84
[58] Field of Search ................. 329/50, 104, 107, 111, 329/122; 375/83-87, 94

[56] References Cited

U.S. PATENT DOCUMENTS

| | | | |
|---|---|---|---|
| 3,758,860 | 9/1973 | Braun et al. | 455/35 |
| 3,939,431 | 2/1976 | Cohlman | 375/5 |
| 3,995,225 | 11/1976 | Horn | 329/106 |

OTHER PUBLICATIONS

Belanger, "Single Op. Amp. Full-Wave Rectifier has no DC Offset", EDN, Apr. 5, 1977, pp. 144, 146.

*Primary Examiner*—Siegfried H. Grimm
*Attorney, Agent, or Firm*—Rolland R. Hackbart; James W. Gillman

[57] ABSTRACT

An improved method and apparatus for detecting the presence of PSK data signals is disclosed. Each data bit of the PSK data signal is encoded with N half-cycle intervals of a carrier signal. In the PSK signal detector, the carrier signal is recovered from the received PSK data signal. The recovered carrier signal is frequency locked to, and at 0° or 180° with respect to, the carrier signal transmitting the PSK data signal. The cross-correlation integral is evaluated between the recovered carrier signal and received PSK data signal for successive half-cycle intervals separated by one data bit to provide corresponding quality signals. An indication that the PSK data signal is present is provided when the magnitude of one of the quality signals is greater than a predetermined magnitude. The data-present indication signal may be further combined with an RF squelch signal provided by a radio receiver for enhancing reliability when the data detector is used in a radio receiver.

15 Claims, 3 Drawing Figures

4,233,565

METHOD AND APPARATUS FOR A PSK SIGNAL DETECTOR

This is a continuation, of application Ser. No. 920,439, filed June 29, 1978 and now abandoned.

TECHNICAL FIELD

The present invention relates to techniques for detecting the presence of data signals, and more particularly, to an improved method and apparatus for detecting the presence of a phase-shift-keyed (PSK) data signal.

BACKGROUND ART

Data signal detectors of the prior art have utilized a technique which accumulates the number of transitions in the data signal occurring in quadrature with the clock signal in order to detect the presence of noise. Thus, noise is present when data transitions occur in quadrature with the clock signal, and data is present when data transitions occur synchronously with the clock signal. A system of this type is described in U.S. Pat. No. 3,995,225. However, the foregoing data detection system requires recovery of a clock signal with the proper phase relationship to the data signal and has relatively slow response times.

According to another technique, the time between successive zero crossings of the recovered data signal is used to detect the presence of a PSK data signal. When the PSK data signal is present, the time between successive zero crossings will be one of two possible time intervals. A system using this technique to detect the presence of a PSK data signal is described in U.S. Pat. No. 3,939,431.

According to a further technique for detection of the presence of a data signal, the frequency spectrum of the received data exhibits predictable characteristics and may be selectively filtered to ascertain the presence or absence of the data signal. Such a data detector is described in U.S. Pat. No. 3,758,860 and in U.S. Pat. No. 4,156,867 entitled "Data Communication System", filed Sept. 6, 1977 by Stephen M. Bench, et al and assigned to the instant assignee. However, the foregoing data detectors have a relatively wide bandwidth and relatively slow response times.

SUMMARY OF THE INVENTION

It is an object of the present invention to provide an improved method and apparatus for detecting the presence of a PSK data signal.

It is another object of the present invention to provide an improved detector of the presence of a PSK data signal that has a relatively narrow carrier signal bandwidth and fast response times.

It is a further object of the present invention to provide a detector for the presence of a PSK data signal that accurately discriminates between the PSK data signal and voice or noise.

Briefly described, the present invention encompasses a method and apparatus for detecting the presence of a PSK data signal. The PSK data signal is serially transmitted by a data clock signal having a predetermined bit frequency, and encoded on a carrier signal having a predetermined carrier frequency, wherein N half-cycle intervals of the carrier signal are provided for each data bit. The carrier signal is recovered from the received PSK data signal. The recovered carrier signal and the received PSK data signal are cross-correlated over each of the N half-cycle intervals to provide corresponding correlation signals. The N consecutive correlation signals are combined with a reference signal to provide a combined signal for each data bit interval. The combined signal is integrated during successive half-cycle intervals separated by one data bit interval, for a predetermined time interval that is at most a half-cycle interval, to provide N quality signals. An indication that the PSK data signal is present is provided when the magnitude of at least one of the quality signals is greater than a predetermined magnitude. When used with a radio receiver, the data-present indication signal may be combined with an RF squelch signal from the ratio receiver to further enhance reliability and performance.

DETAILED DESCRIPTION OF THE INVENTION

Figure 1:
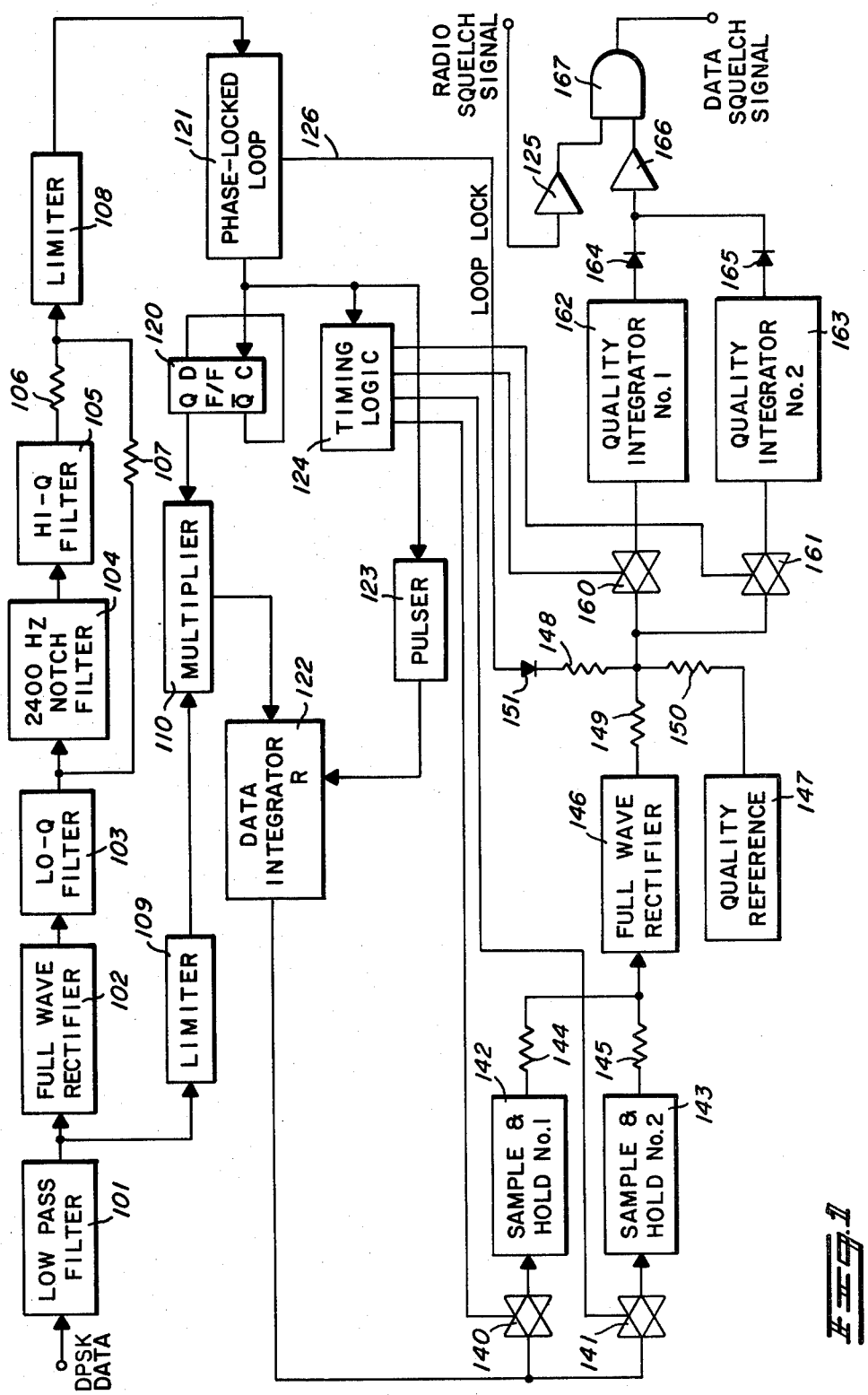
FIG. 1 is a block diagram of a PSK signal detector embodying the present invention.

In FIG. 1, there is illustrated a PSK signal detector embodying the present invention. The detector may receive either PSK data signals or differential PSK (DPSK) data signals. The preferred embodiment will be described in terms of a DPSK data signal having a 2400 Hz carrier signal. According to DPSK, the phase of the carrier is reversed for each logical one bit while the phase of the carrier remains the same for each logical zero bit. Furthermore, the bit frequency of the DPSK data signal is the same as the carrier rate, although any suitable bit frequency in relation to the carrier frequency may be utilized in practicing the present invention. For example, two half-cycles of the carrier are utilized for each data bit in the preferred embodiment, although 3, 4 or N, where N is an integer, half-cycles of the carrier may likewise be utilized for each data bit.

The input to the PSK signal detector of FIG. 1 may be taken directly from the FM detector of a radio receiver. Although, in practicing the present invention, the PSK signal detector may receive the PSK data signal from any suitable source, such as a telephone line. Thus, the input to the data detector may be exposed to voice, noise and other regular or random spurious signals, in addition to the desired DPSK data signal. In practicing the invention, a harmonic of the carrier frequency is recovered from the DPSK data signal by a suppressed carrier tracking loop 102 to 108 and 121. In the preferred embodiment, the suppressed carrier tracking loop locks to the second harmonic 4800 Hz of the 2400 Hz carrier signal. The 4800 Hz second harmonic signal is then divided by two to provide a recovered 2400 Hz carrier signal. In addition, the suppressed carrier tracking loop provides a loop-lock indication signal when the loop is locked to the 4800 Hz second harmonic signal. The recovered 2400 Hz carrier signal may be phase locked at 0° or 180° with respect to the 2400 Hz carrier signal transmitting the DPSK data signal. The PSK data detector will tolerate a predetermined amount of variance in the phase relationship between the recovered and transmitting 2400 Hz carrier signal.

The data detector of the present invention will properly detect the presence of the DPSK data signal regardless of whether the phase relationship is 0° or 180° between the recovered and transmitting 2400 Hz carrier signal.

In order to circumvent the problem of locating the boundaries between each bit of the received DPSK data signal, the data detector evaluates the cross-correlation integral between the carrier signal and the PSK data signal over each of the N half-cycle intervals and combined the N cross-correlation integrals for each data bit interval, which may or may not coincide with the transmitted data bit interval. The composite of the N cross-correlation integrals will have a relatively high magnitude for half-cycle intervals separated by one data bit interval which coincide with the transmitted data bit interval. In other words, the composite has a relatively high magnitude at the end of the transmitted data bit interval. Since only the magnitude of the composite is important, the fact that the recovered 2400 Hz carrier signal is 0° or 180° with respect to the transmitting 2400 Hz carrier signal is inconsequential.

The composite is referred to a reference signal and, at successive half-cycle intervals separated by one data bit, integrated by N integrators for a predetermined time interval that is at most a half-cycle interval to provide N quality signals. When the magnitude of one of the N quality signals from the integrators reaches a predetermined magnitude, the data detector provides an indication that the DPSK data signal is present. The reliability of the data detector may be further enhanced by gating the RF squelch signal from the radio receiver with the data present indication, and providing a data squelch signal when both the RF squelch signal and the data present indication signal are both present.

Figure 2:
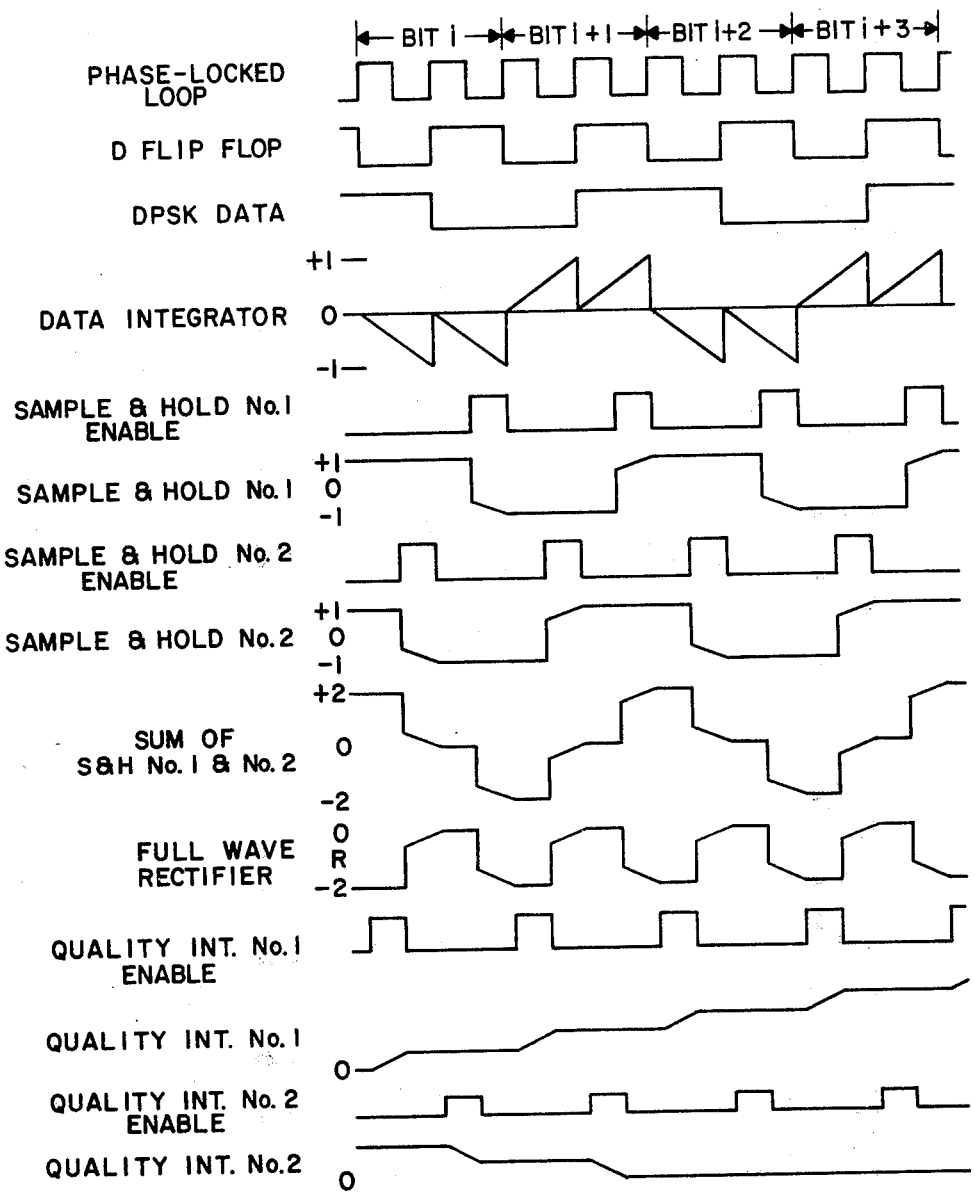
FIG. 2 shows the waveforms at the outputs of corresponding blocks of FIG. 1, where two half cycles of the carrier signal are utilized for each data bit.

Referring to FIG. 1, the DPSK data signal is applied to low pass filter 101 which provides a predetermined attenuation to frequencies above the 2400 Hz carrier frequency. The output of the low pass filter 101 is then applied to full wave rectifier 102 and limiter 109. The output of the limiter 109 is illustrated by the DPSK data waveform of FIG. 2, which shows four consecutive logical one data bits. Furthermore, FIG. 2 illustrates the waveforms at the outputs of all of the major blocks of FIG. 1 produced by the illustrated DPSK data waveform.

The full wave rectifier 102 provides the 4800 Hz second harmonic of the 2400 Hz carrier signal. A suitable circuit for the full wave rectifier 102 is described in the article entitled, "Single OP-AMP Full-Wave Rectifier Has No DC Offset", by Don Belanger, published in Electronics Design News, Apr. 5, 1977, at pages 144 and 145. The output of the full wave rectifier is applied to a 4800 Hz bandpass filter 103 to 107. The bandpass filter is comprised of a low-Q 4800 Hz filter 103 followed by a 2400 Hz notch filter 104 and a hi-Q 4800 Hz filter 105. The output of the bandpass filter is provided by voltage addition of the low-Q 4800 Hz filter 103 through resistor 107 to the hi-Q 4800 Hz filter through resistor 106. The output of the bandpass filter is applied to limiter 108 and thereafter to phase-locked loop 121.

The phase-locked loop 121 locks to the 4800 Hz second harmonic of the 2400 Hz carrier signal and provides a looplock indication signal 126. The phase-locked loop 121 may be realized by any suitable commercially available integrated circuits, such as the Signetics 567. The output of the phase-locked loop 121 (see FIG. 2) is applied to delay flip-flop 120, which divides the 4800 Hz second harmonic signal by two to provide a recovered carrier signal (see FIG. 2) to multiplier 110. The delay flip-flop changes state where transitions are allowed or at the beginning of each half-cycle interval of the transmitting 2400 Hz carrier signal. The recovered carrier signal from delay flip-flop 120 may be phased by 0° or 180° with respect to the carrier signal transmitting the DPSK data signal.

The multiplier 110 multiplies the DPSK data signal from the limiter 109 with the recovered carrier signal from delay flip-flop 120 and provides a multiplied output signal to the data integrator 122. The multiplier may be any suitable multiplying device, such as an EXCLUSIVE-OR gate.

The data integrator 122 (see FIG. 2) integrates the multiplied output signal from the multiplier 110 over each of the half-cycle intervals between the 2400 Hz carrier signal transitions. At the end of each of the intervals, the data integrator 122 is reset by a pulse signal from pulser 123. Pulser 123 develops a pulse at the rising edge of the 4800 Hz second harmonic signal from the phase-locked loop 121.

The integrated signal from the data integrator 122 is applied to analog switches 140 and 141 and thereafter to sample and hold number one 142 and sample and hold number two 143, respectively. Sample and hold number one and two 142 and 143 may include a holding capacitor followed by a unity-gain buffer amplifier. The analog switches 140, 141, 160 and 161 are enabled by timing signals from the timing logic 124. The timing signals, developed by the timing logic 124 from the 4800 Hz second harmonic signal from the phase-locked loop 121, are each a train of sample pulses having a pulse width that is one-fourth of a cycle interval (see FIG. 2). The sample pulses from the timing logic 124 may be provided by a ring shift counter. Sample and hold number one 142 is enabled to sample at the end of each bit interval, while sample and hold number two 143 is enabled to sample at the center of each bit interval. Here again, the recovered bit interval need not coincide with the transmitted bit interval. The samples are then held for one full bit interval. The held samples from sample and hold number one and number two 142 and 143 are voltage-added through resistors 144 and 145, respectively, and thereafter applied to full wave rectifier 146. The waveform of the voltage addition of sample and hold number one and number two 142 and 143 is illustrated in the corresponding waveform of FIG. 2.

The full wave rectifier 146 provides a rectified output signal (see FIG. 2) of the voltage addition of sample and hold number one and number two 142 and 143. The full-wave-rectified signal from the full wave rectifier 146 is then voltage added to a reference voltage signal from quality reference 147 and the loop-lock indication signal 126, the sum being formed by resistor 149, resistor 150 and diode 151 and resistor 148, respectively. When the phase-locked loop 121 is locked to the 4800 Hz second harmonic signal, the loop-lock indication signal 126 provides a low voltage which effectively reverse biases diode 151 and prevents a voltage contribution from the loop-lock indication signal 126. However, when the phase-locked loop 121 is out of lock, the loop-lock indication signal 126 in at a relatively high voltage which forward biases diode 151 and contributes via resistor 148 to the sum of the voltages at the junction of resistors 148 to 150. Thus, during normal operation the phase-locked loop 121 is locked and the sum of the voltages at the junction of resistors 148 to 150 is comprised essentially of the full-wave-rectified signal from full wave rectifier 146 and the reference voltage signal from quality reference 147.

The sum of the voltages at the junction of resistors 148 to 150 is a measure of the quality of the DPSK data signal. The quality of the received DPSK data signal may be referred to a reference voltage signal of predetermined magnitude provided by quality reference 147. The reference voltage signal from quality reference 147 may be appropriately adjusted depending on the level of acceptability of the DPSK data signal and the carrier signal bandwidth desired for the particular application. A higher reference voltage from the quality reference 147 would necessarily require a higher degree of cross-correlation in the received DPSK data signal before a data-present indication is provided.

The full wave rectifier waveform of FIG. 2 may be referred to the level R and thereafter applied, via analog switches 160 and 161, to quality integrators number one 162 and number two 163, respectively. When quality integrator number one 162 is enabled to integrate, the integrator waveform constantly increases because it integrates samples at the end of a transmitted bit interval (FIG. 2). However, when quality integrator number two 163 is enabled to integrate, the integrator waveform constantly decreases because it integrates samples within the transmitted bit interval (see FIG. 2). Thus the integrator waveform of quality integrator number one 162 reflects a high degree of bit quality and approaches a maximum voltage level, in the preferred embodiment the +V voltage supply. However, quality integrator number two 163 reflects a relatively low degree of bit quality and therefore approaches a zero voltage level. The low degree of quality of quality integrator number two 163 is due to the phase reversal of, and sampling within, successive bits. The outputs of quality integrator number one and number two 162 and 163 are applied to diodes 164 and 165, and the integrator output having the highest voltage magnitude is thereafter applied to buffer gate 166. Buffer gate 166 provides an output indicating that a DPSK data signal is present when at least one of the integrator outputs is greater than a predetermined magnitude. For example, buffer gate 166 may be a Schmitt trigger which provides a data-present indication signal when at least one of the integrator outputs exceeds the upper switching threshold of the Schmitt trigger. Furthermore, once the upper switching threshold is exceeded, the magnitude of the integrator output necessary to maintain the data-present indication from the Schmitt trigger is relaxed. The data-present indication signal from buffer gate 166 may be applied to AND gate 167 together with an RF squelch signal buffered via buffer gate 125. AND 167 provides a data squelch signal when the data-present indication signal is provided by buffer gate 166 and the RF squelch signal is provided by buffer gate 126. In practicing the present invention, the data-present indication signal from buffer gate 166 need not be gated with the RF squelch signal. However, in the preferred embodiment, the RF squelch signal is gated with the data-present indication signal from buffer gate 166 to provide a higher degree of reliability and to increase response times. Furthermore, the RF squelch signal may be combined directly with Schmitt trigger 166 for adjusting the switching thresholds thereof to provide an enabling operation instead of an ANDing operation.

Figure 3:
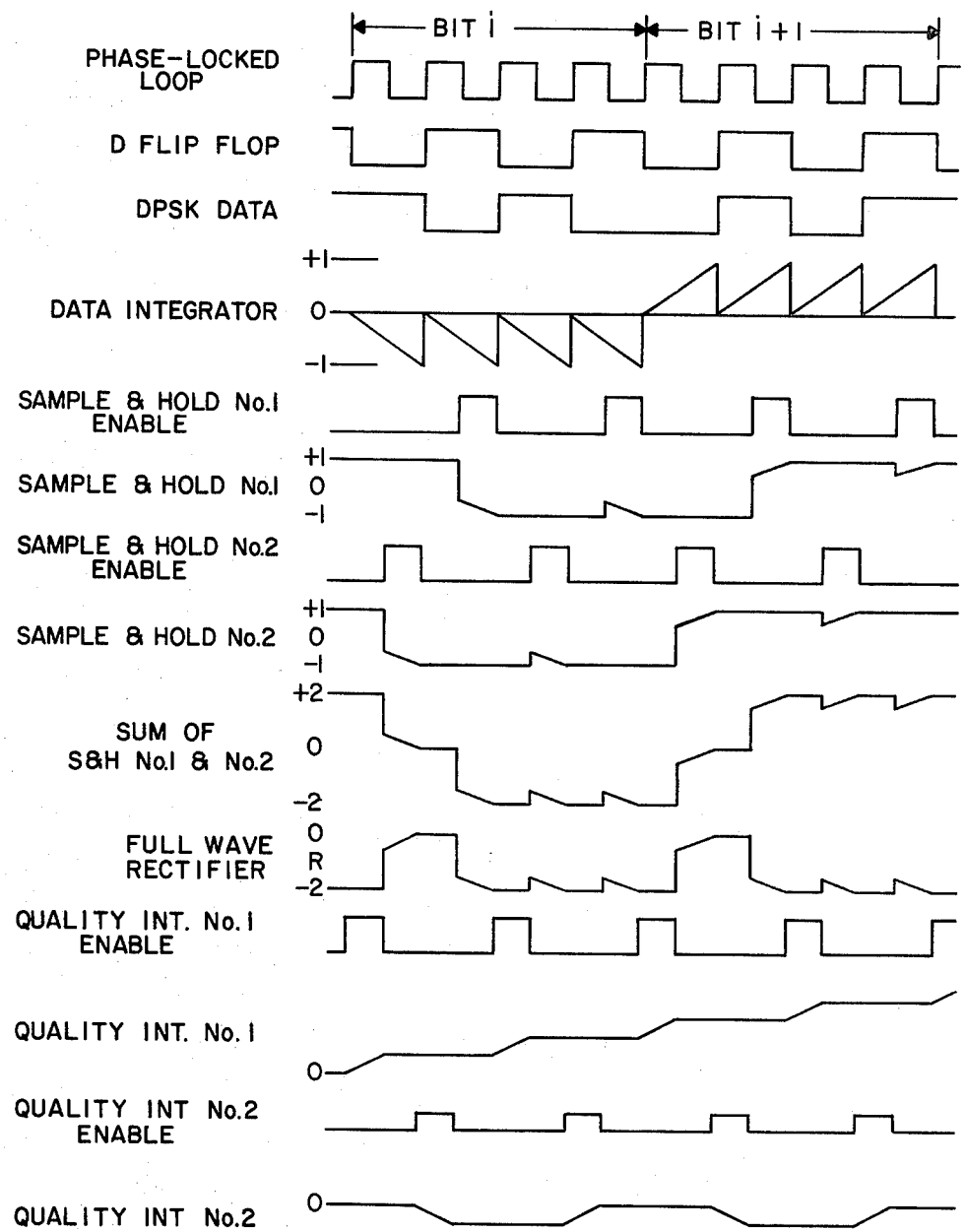
FIG. 3 shows the waveforms at the outputs of corresponding blocks of FIG. 1, where four half cycles of the carrier signal are utilized for each data bit.

The general applicability of the present invention may be more fully understood by reference to FIG. 3, which illustrates the same waveforms shown in FIG. 2, with the exception that four half cycles of the carrier signal are provided for each data bit. The waveforms of FIG. 2 and FIG. 3 clearly demonstrate that the PSK signal detector of FIG. 1 not only detects a PSK signal where two half cycles of the carrier signals are provided for each data bit, but also detects a PSK signal where four half cycles of the carrier signal are provided for each data bit. Moreover, the PSK signal detector of the present invention, which combines M consecutive correlation signals (such as the embodiment illustrated in FIG. 1, where M=2), may detect any PSK signal where N half cycles of the carrier signal are provided for each data bit and M is a factor of N greater than one.

I claim:

1. A detector for detecting the presence of a phase-shift-keyed (PSK) data signal serially transmitted by a data clock signal at a predetermined bit frequency, and encoded on a carrier signal at a predetermined carrier frequency, wherein N half-cycle intervals of the carrier signal are provided for each data bit, said detector comprising:

means for recovering from the PSK data signal the carrier signal;

means for multiplying the PSK data signal and the recovered carrier signal to provide a multiplied signal;

first means for integrating the multiplied signal over each half-cycle interval to provide an integrated signal;

sample and hold means for sampling the integrated signal at the end of each half-cycle interval and storing N consecutive samples;

first means for combining the N consecutive stored samples to provide a first combined signal;

means for full wave rectifying the first combined signal;

means for providing a predetermined reference signal;

second means for combining the full wave rectified first combined signal and the predetermined reference signal to provide a second combined signal, the second combined signal being representative of the difference between the full-wave-rectified first combined signal and the reference signal;

second means for integrating at successive half-cycle intervals separated by one data bit, the second combined signal for a predetermined time interval that is at most a half-cycle interval to provide corresponding quality signals; and means for providing an indication that the PSK data signal is present when the magnitude of at least one of the quality signals is greater than a predetermined magnitude.

2. The PSK signal detector according to claim 1, wherein said recovering means includes means for providing a carrier indication signal when the carrier signal is present, the data indication providing means providing the data present indication when the magnitude of at least one of the quality signals is greater than a predetermined magnitude and the carrier indication signal is provided by the recovering means.

3. The PSK signal detector according to claims 1 or 2, for use with a radio having a receiver for receiving the PSK data signal from an RF signal, the radio receiver providing an RF squelch signal when the RF signal is present, the data indication providing means being enabled by the RF squelch signal.

4. A method for detecting the presence of a phase-shift-keyed (PSK) data signal serially transmitted by a data clock signal having a predetermined bit frequency, and encoded on a carrier signal having a predetermined carrier frequency, wherein N half-cycle intervals of the carrier signal are provided for each data bit, said method comprising the steps of:
 (a) recovering the carrier signal from the PSK data signal;
 (b) cross-correlating the carrier signal and PSK data signal over each of the N half-cycle intervals to provide corresponding correlation signals;
 (c) combining the N consecutive correlation signals and a reference signal to provide a combined signal for each data bit interval;
 (d) integrating the combined signal during successive half-cycle intervals separated by one data bit interval, for a predetermined time interval that is at most a half-cycle interval, to provide N quality signals; and
 (e) providing an indication that the PSK data signal is present when the magnitude of at least one of the quality signals is greater than a predetermined magnitude.

5. The method according to claim 4 for transmitting via an RF signal the PSK data signal to a radio receiver, the radio receiver providing an RF squelch signal when the RF carrier is present, said data indication providing step being enabled to provide the data indication signal when the RF squelch signal is provided by the radio receiver.

6. The method according to claim 4, wherein said carrier recovering step includes providing a carrier indication signal when the carrier signal is present, said combining step including combining the carrier indication signal and the N correlation signals to provide a combined signal.

7. A detector for detecting the presence of a phase-shift-keyed (PSK) data signal serially transmitted by a data clock signal at a predetermined bit frequency, and encoded on a carrier signal at a predetermined carrier frequency, wherein N half-cycle intervals of the carrier signal are provided for each data bit, said detector comprising:
 means for recovering from the PSK data signal the carrier signal;
 means for multiplying the PSK data signal and the recovered carrier signal to provide a multiplied signal;
 first means for integrating the multiplied signal over each half-cycle interval to provide an integrated signal;
 sample and hold means for sampling the integrated signal at the end of each half-cycle interval and storing M consecutive samples;
 first means for combining M consecutive stored samples to provide a first combined signal, where M is a factor of N greater than one;
 means for full wave rectifying the first combined signal;
 means for providing a predetermined reference signal;
 second means for combining the full wave rectified first combined signal and the predetermined reference signal to provide a second combined signal, the second combined signal being representative of the difference between the full-wave-rectified first combined signal and the reference signal;
 second means for integrating at successive half-cycle intervals separated by M half-cycle intervals, the second combined signal for a predetermined time interval that is at most a half-cycle interval to provide corresponding quality signals; and
 means for providing an indication that the PSK data signal is present when the magnitude of at least one of the quality signals is greater than a predetermined magnitude.

8. The PSK signal detector according to claim 7, wherein said recovering means includes means for providing a carrier indication signal when the carrier signal is present, the data indication providing means providing the data present indication when the magnitude of at least one of the quality signals is greater than a predetermined magnitude and the carrier indication signal is provided by the recovering means.

9. The PSK signal detector according to claim 7 or 8, for use with a radio having a receiver for receiving the PSK data signal from an RF signal, the radio receiver providing an RF squelch signal when the RF signal is present, the data indication providing means being enabled by the RF squelch signal.

10. A method for detecting the presence of a phase-shift-keyed (PSK) data signal serially transmitted by a data clock signal having a predetermined bit frequency, and encoded on a carrier signal having a predetermined carrier frequency, wherein N half-cycle intervals of the carrier signal are provided for each data bit, said method comprising the steps of:
 (a) recovering the carrier signal from the PSK data signal;
 (b) cross-correlating the carrier signal and PSK data signal over each half-cycle interval to provide corresponding correlation signals;
 (c) combining M consecutive correlation signals and a reference signal to provide a combined signal, where M is factor of N greater than one;
 (d) integrating the combined signal during successive half-cycle intervals separated by M half-cycle intervals, for a predetermined time interval that is at most a half-cycle interval, to provide M quality signals; and
 (e) providing an indication that the PSK data signal is present when the magnitude of at least one of the quality signals is greater than a predetermined magnitude.

11. The method according to claim 10 for transmitting via an RF signal the PSK data signal to a radio receiver, the radio receiver providing an RF squelch signal when the RF carrier is present, said data indication providing step being enabled to provide the data indication signal when the RF squelch signal is provided by the radio receiver.

12. The method according to claim 10, wherein said carrier recovering step includes providing a carrier indication signal when the carrier signal is present, said combining step including combining the carrier indication signal and the M correlation signals to provide a combined signal.

13. A detector for detecting the presence of a phase-shift-keyed (PSK) data signal serially transmitted by a data clock signal having a predetermined bit frequency, and encoded on a carrier signal having a predetermined carrier frequency, wherein N half-cycle intervals of the carrier signal are provided for each data bit, said detector comprising:

(a) means for recovering the carrier signal from the PSK data signal;
(b) means for cross-correlating the carrier signal and PSK data signal over each half-cycle interval to provide corresponding correlation signals;
(c) means for combining M consecutive correlation signals and a reference signal to provide a combined signal, where M is a factor of N greater than one;
(d) means for integrating the combined signal during successive half-cycle intervals separated by M half-cycle intervals, for a predetermined time interval that is at most a half-cycle interval, to provide M quality signals; and
(e) means for providing an indication that the PSK data signal is present when the magnitude of at least one of the quality signals is greater than a predetermined magnitude.

14. The detector according to claim 13 for transmitting via an RF signal the PSK data signal to a radio receiver, the radio receiver providing an RF squelch signal when the RF carrier is present, said indication providing means being enabled to provide the data indication signal when the RF squelch signal is provided by the radio receiver.

15. The detector according to claim 13, wherein said carrier recovering means includes means for providing a carrier indication signal when the carrier signal is present, said combining means including means for combining the carrier indication signal and the M correlation signals to provide a combined signal.

* * * * *

UNITED STATES PATENT AND TRADEMARK OFFICE
CERTIFICATE OF CORRECTION

PATENT NO. : 4,233,565
DATED : NOVEMBER 11, 1980
INVENTOR(S) : STANLEY J. CHMURA

It is certified that error appears in the above—identified patent and that said Letters Patent is hereby corrected as shown below:

Col. 2, line 14, "ratio" should be --radio--

Col. 3, lines 9 & 10, "combined" should be --combines--.

Col. 4, line 62, "in" should be --is--.

Col. 5, line 52, insert -- gate-- between "AND" and "167".

Col. 5, line 55, "126" should be --125--.

Signed and Sealed this

Second Day of June 1981

[SEAL]

Attest:

RENE D. TEGTMEYER

Attesting Officer

Acting Commissioner of Patents and Trademarks